United States Patent
Walter et al.

(10) Patent No.: US 10,120,959 B2
(45) Date of Patent: Nov. 6, 2018

(54) APPARATUS AND METHOD FOR DISPLAYING A NODE OF A TREE STRUCTURE

(71) Applicant: Rockwell Automation Technologies, Inc., Mayfield Heights, OH (US)

(72) Inventors: Jonathan D. Walter, Mayfield Heights, OH (US); Timothy J. Menge, Mayfield Heights, OH (US); David W. Comeau, Chagrin Falls, OH (US); Lawrence C. Bradley, Mayfield Heights, OH (US); Cheney Chengquan Shi, Dalian (CN); Winson Guangwen Sun, Dalian (CN); Ronald E. Bliss, Twinsburg, OH (US); David A. Snyder, Waukesha, WI (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 348 days.

(21) Appl. No.: 15/140,897

(22) Filed: Apr. 28, 2016

(65) Prior Publication Data

US 2017/0316113 A1    Nov. 2, 2017

(51) Int. Cl.
G06F 17/30    (2006.01)

(52) U.S. Cl.
CPC .. G06F 17/30994 (2013.01); G06F 17/30961 (2013.01)

(58) Field of Classification Search
CPC ............ G06F 17/30994; G06F 17/30961
See application file for complete search history.

(56) References Cited

U.S. PATENT DOCUMENTS

| | | | |
|---|---|---|---|
| 6,271,846 B1* | 8/2001 | Martinez | G06F 3/0482 715/854 |
| 6,448,985 B1* | 9/2002 | McNally | G06F 3/0481 715/784 |
| 7,203,701 B1* | 4/2007 | Packebush | G06F 17/30961 |
| 7,325,201 B2* | 1/2008 | Ferrari | G06F 17/30864 707/999.002 |
| 8,850,362 B1* | 9/2014 | Khoshnevisan | G06F 17/30961 715/853 |
| 2004/0125124 A1* | 7/2004 | Kim | G06F 17/30799 715/716 |
| 2007/0239710 A1* | 10/2007 | Jing | G06F 17/30864 |
| 2010/0281064 A1* | 11/2010 | Ikegami | G06F 17/2241 707/797 |
| 2013/0173593 A1* | 7/2013 | Nations | G06F 17/30864 707/722 |
| 2015/0081685 A1* | 3/2015 | Ashenfelter | G06F 17/30961 707/723 |
| 2016/0335303 A1* | 11/2016 | Madhalam | G06F 17/3056 |

* cited by examiner

*Primary Examiner* — Boris Gorney
*Assistant Examiner* — Tiffany Thuy Bui
(74) *Attorney, Agent, or Firm* — Kunzler, PC

(57) ABSTRACT

For displaying a node of a tree structure, a processor receives an anchor node creation command for a given node of a tree structure of nodes. The given node has one or more branches of parent nodes. The processor further removes the one or more branches of parent nodes and branches of sibling nodes of the given node from a display of the tree structure. In addition, the processor displays the given node as a topmost node of the tree structure.

20 Claims, 14 Drawing Sheets

APPARATUS AND METHOD FOR DISPLAYING A NODE OF A TREE STRUCTURE

BACKGROUND INFORMATION

The subject matter disclosed herein relates to displaying a node of a tree structure.

BRIEF DESCRIPTION

An apparatus for displaying a node of a tree structure is disclosed. The apparatus includes a processor and a memory. The memory stores code executable by the processor to receive an anchor node creation command for a given node of a tree structure of nodes. The given node has one or more branches of parent nodes. The processor further removes the one or more branches of parent nodes and branches of sibling nodes of the given node from a display of the tree structure. In addition, the processor displays the given node as a topmost node of the tree structure.

A method for displaying a node of a tree structure is also disclosed. The method receives, by use of a processor, an anchor node creation command for a given node of a tree structure of nodes. The given node has one or more branches of parent nodes. The method further removes the one or more branches of parent nodes and branches of sibling nodes of the given node from a display of the tree structure. In addition, the method displays the given node as a topmost node of the tree structure.

A non-transitory computer-readable storage medium for displaying a node of a tree structure is disclosed. The computer-readable storage medium has instructions stored thereon that, in response to execution, cause a system comprising a processor to perform operations including receiving an anchor node creation command for a given node of a tree structure of nodes, wherein the given node has one or more branches of parent nodes. The operations further include removing the one or more branches of parent nodes and branches of sibling nodes of the given node from a display of the tree structure. In addition, the operations include displaying the given node as a topmost node of the tree structure.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
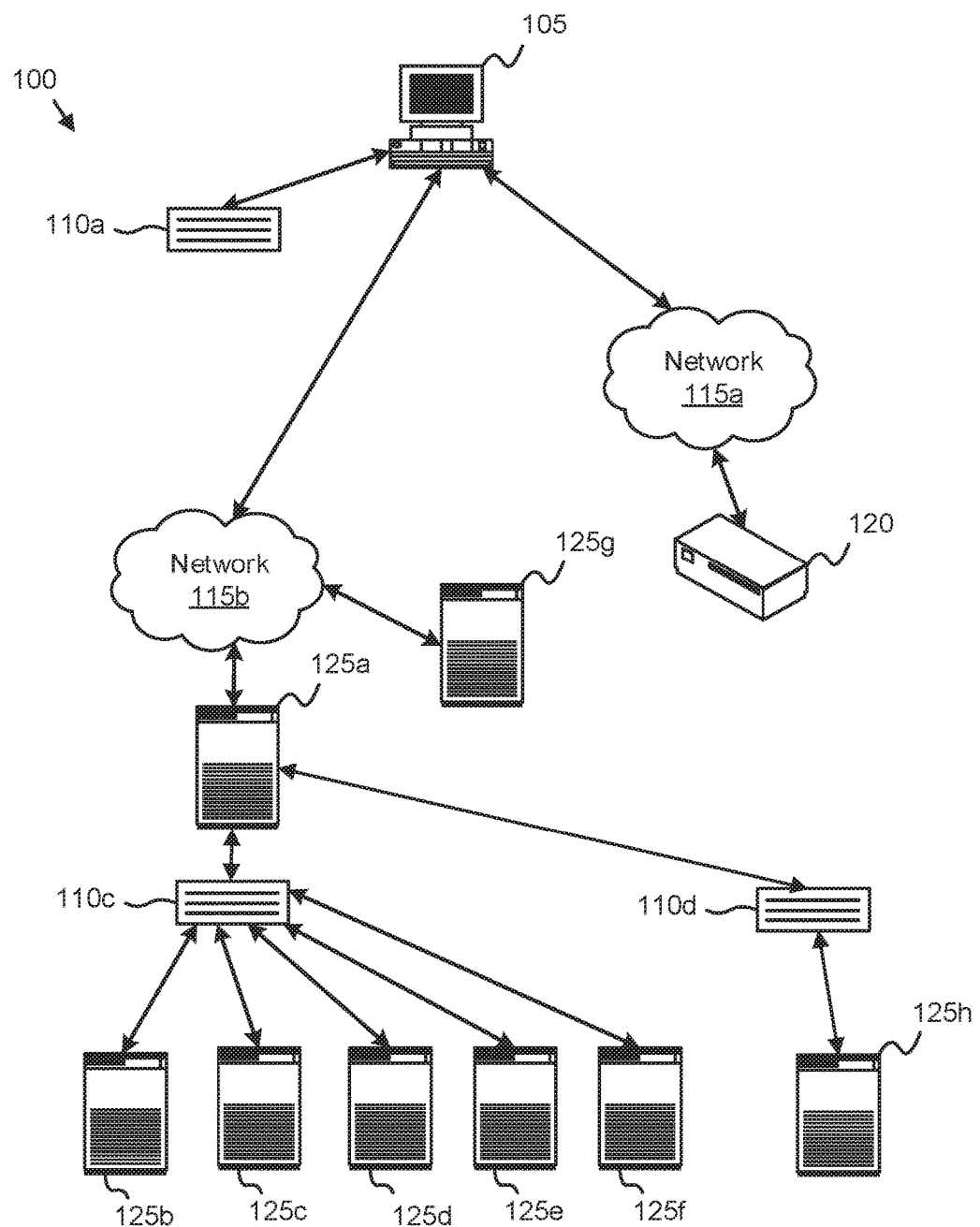
FIG. 1 is a schematic diagram of an electronic system according to an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program product may be shared, simultaneously serving multiple customers in a flexible, automated fashion.

The computer program product may be integrated into a client, server and network environment by providing for the computer program product to coexist with applications, operating systems and network operating systems software and then installing the computer program product on the clients and servers in the environment where the computer program product will function. In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

Figure 2A:
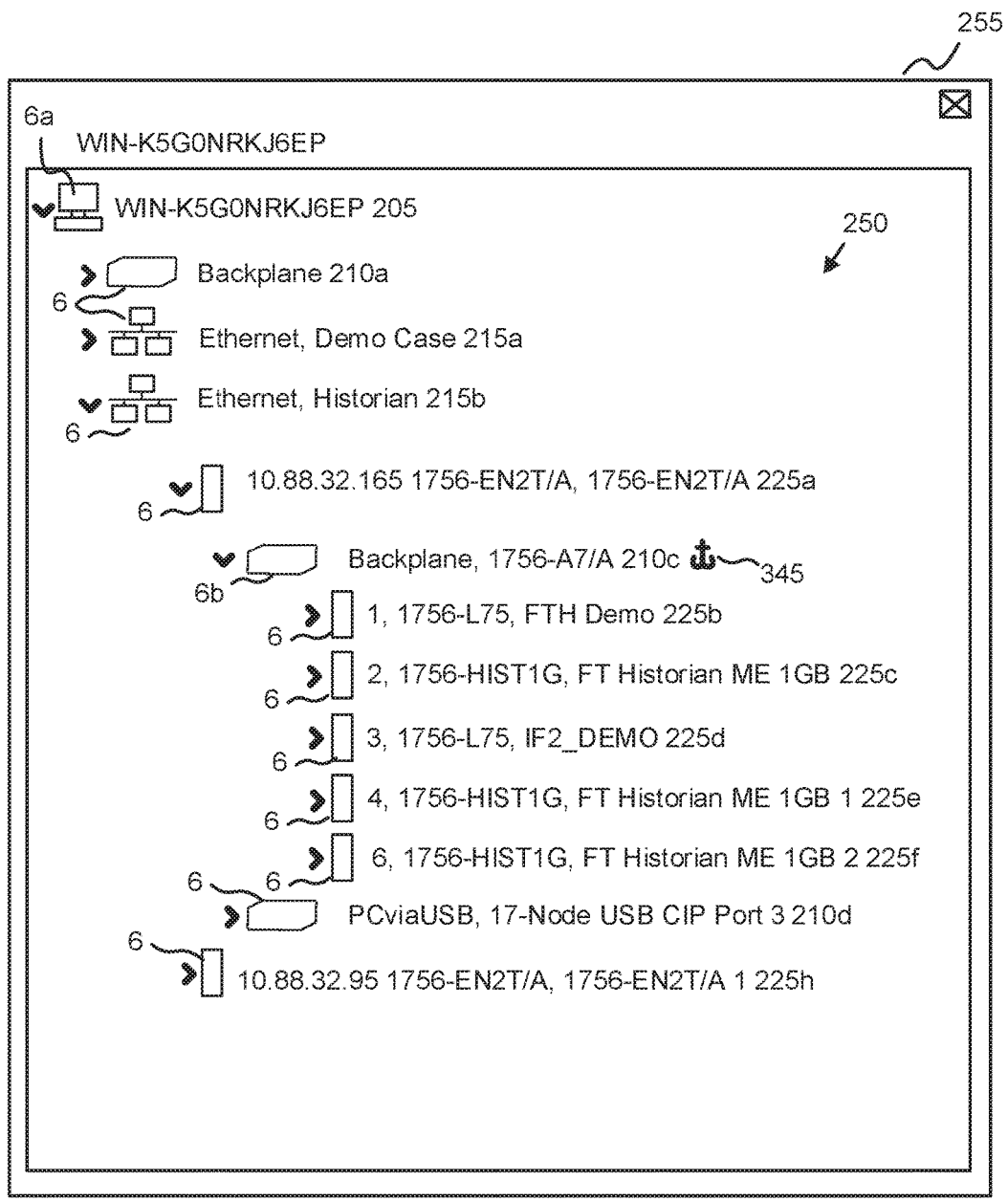
FIG. 2A is a drawing of a tree structure display according to an embodiment.

Tree structures are often used to display hierarchies of nodes that represent hardware objects, software objects, and the like. An example of a tree structure is shown in FIG. 2A. A tree structure may include a topmost node. Child nodes may branch from the topmost node, and the child nodes may in turn be parent nodes for branches of other child nodes. Some hierarchies of nodes may be quite complex, with numerous levels of nodes in the hierarchy.

Unfortunately, when a tree structure is used to display and/or manage a node at a very low level of a hierarchy, a display may be filled with many branches of parent/child node relationships that make it more difficult to view and manage nodes of interest.

The embodiments described herein receive an anchor node creation command for a given node of a tree structure of nodes. The anchor node creation command may be executed with little overhead or effort. In response to the anchor node creation command, the embodiments may remove one or more branches of parent nodes and sibling nodes of the given node from the display of the tree structure. In addition, the embodiments may display the given node as a topmost node of the tree structure. As a result, the given node may be easily viewed and managed. In addition, a user may easily expand the branches of sibling nodes and/or child nodes of the given node and navigate to those sibling and/or child nodes while the given node remains as an anchor node in a topmost position.

FIG. 1 is a schematic diagram of an electronic system 100. The electronic system 100 may include one or more nodes. Each node may be an electronic device, a network connection, and the like. In one embodiment, the nodes include terminals 105, backplanes 110, networks 115, bridges 120, devices 125, modules, drivers, and the like. In the depicted embodiment, a terminal 105 is a topmost node of a hierarchy that comprises one or more backplanes 110*a-d*, one or more networks 115*a-b*, a bridge 120, and one or more devices 125*a-h*.

FIG. 2A is a drawing of a tree structure display. In the depicted embodiment, the tree structure 250 is displayed within a window 255 of a display. The tree structure 250 includes a plurality of nodes 6 including a topmost node 6*a*. The nodes 6 may represent terminals 205, backplanes 210, networks 215, devices 225, and the like. In one embodiment, the user may desire to view and/or manage the given node 6*b* corresponding to backplane 110*c*/210*c*. Unfortunately, because of the many open branches of nodes 6 between the topmost node 6*a* and the given node 6*b*, the given node 6*b* is multiple branches from the topmost node 6*a*, reducing the space available for branches of child nodes 6 of the given node 6*b*. Branches of child nodes 6 of the given node 6*b* that are subsequently opened will further reduce the available space for displaying the system topology in the tree structure 250, and may require the branches of parent nodes 6 are scrolled out of sight. As a result, a user may have difficulty visualizing the context of the system topology that is viewed.

In one embodiment, an anchor node creation command is received by displaying an anchor option 345 in response to the selection of the given node 6*b* in the tree structure 250 and receiving a selection of the anchor option 345.

An anchor node creation command may be received for the given node 6*b*. The anchor node creation command may be one of a right pointer click, a double pointer click, a hover pointer, a pointer clockwise circle, a pointer counterclockwise circle, or the like. Alternatively, the anchor node creation command may be selected from a menu in response to a pointer click, a right pointer click, a double pointer click, a hover pointer, a pointer clockwise circle, a pointer counterclockwise circle, or the like.

Figure 2B:
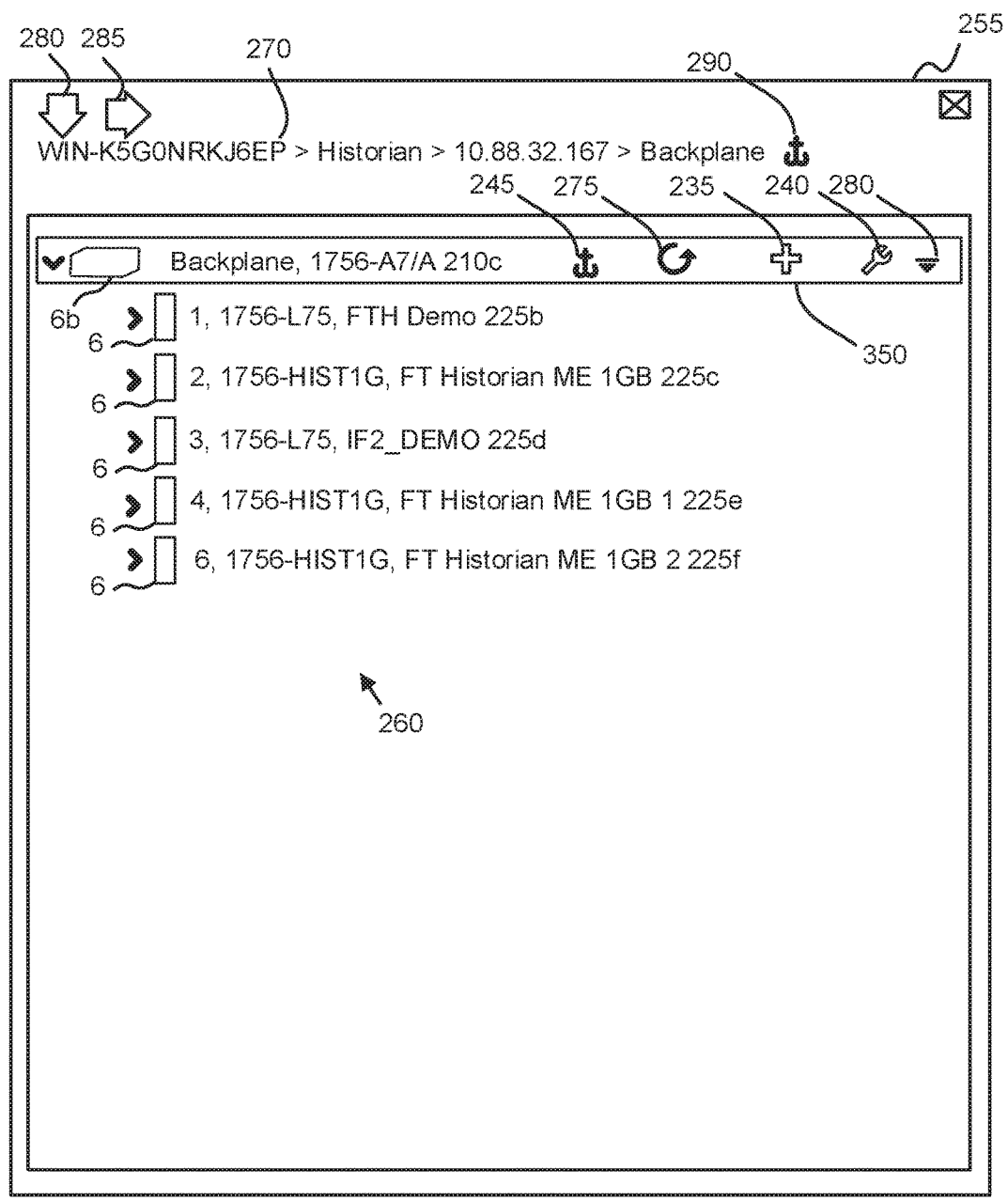
FIG. 2B is a drawing of an anchor node tree structure display according to an embodiment.

FIG. 2B is a drawing of an anchor node tree structure display. In the depicted embodiment, the anchor node tree structure 260 is displayed within a window 255 of a display. As shown, the anchor node tree structure 260 is displayed toward the top left corner of the window 255 so that more of the system topology of interest is visible to the user within the horizontal and vertical space of the window 255. The branches of parent nodes 6 and branches sibling nodes 6 of the given node 6b of FIG. 2A may be removed from the display of the tree structure 250 of FIG. 2A. In addition, the given node 6b may be displayed as a topmost node of the anchor node tree structure 260.

In the depicted embodiment, a compact listing 270 is displayed. The compact listing 270 may include one or more branches of parent nodes 6 of the given node 6b. In one embodiment, the compact listing 270 is organized as breadcrumbs. Alternatively, the compact listing 270 may be organized as a horizontal dependency diagram. In a certain embodiment, the compact listing 270 is restricted to between one and three lines. The compact listing 270 provides the user with the context for the system topology that the user is viewing. The compact listing 270 may be organized horizontally to provide more area for viewing nodes of interest in the system topology.

In one embodiment, the compact listing 270 includes an anchor position symbol 290. The anchor position symbol 290 may indicate the relationship of the given node 6b to the branches of parent nodes 6 in the compact listing 270.

In one embodiment, a user may navigate to one or more branches of child nodes 6 of the given node 6b in response to navigation commands. The navigation commands may be generated by a pointing device. Alternatively, the user may select displayed navigation commands 280/285 such as a child navigation commands 280 and a sibling navigation command 285.

In one embodiment, anchor controls 350 are displayed for the given node 6b. The anchor controls 350 may include a settings option 240 that modifies the display settings for the given node 6b and all branches of child nodes 6 of the given node 6b. In addition, the anchor controls 350 may include an anchor node command 245, a refresh command 275, an add link command 235, and a menu command 280. The anchor node command 245 may remove the given node 6b as the topmost node as will be described hereafter. Alternatively, the anchor node command 245 may designate the given node 6b as the topmost node.

Figure 2C:
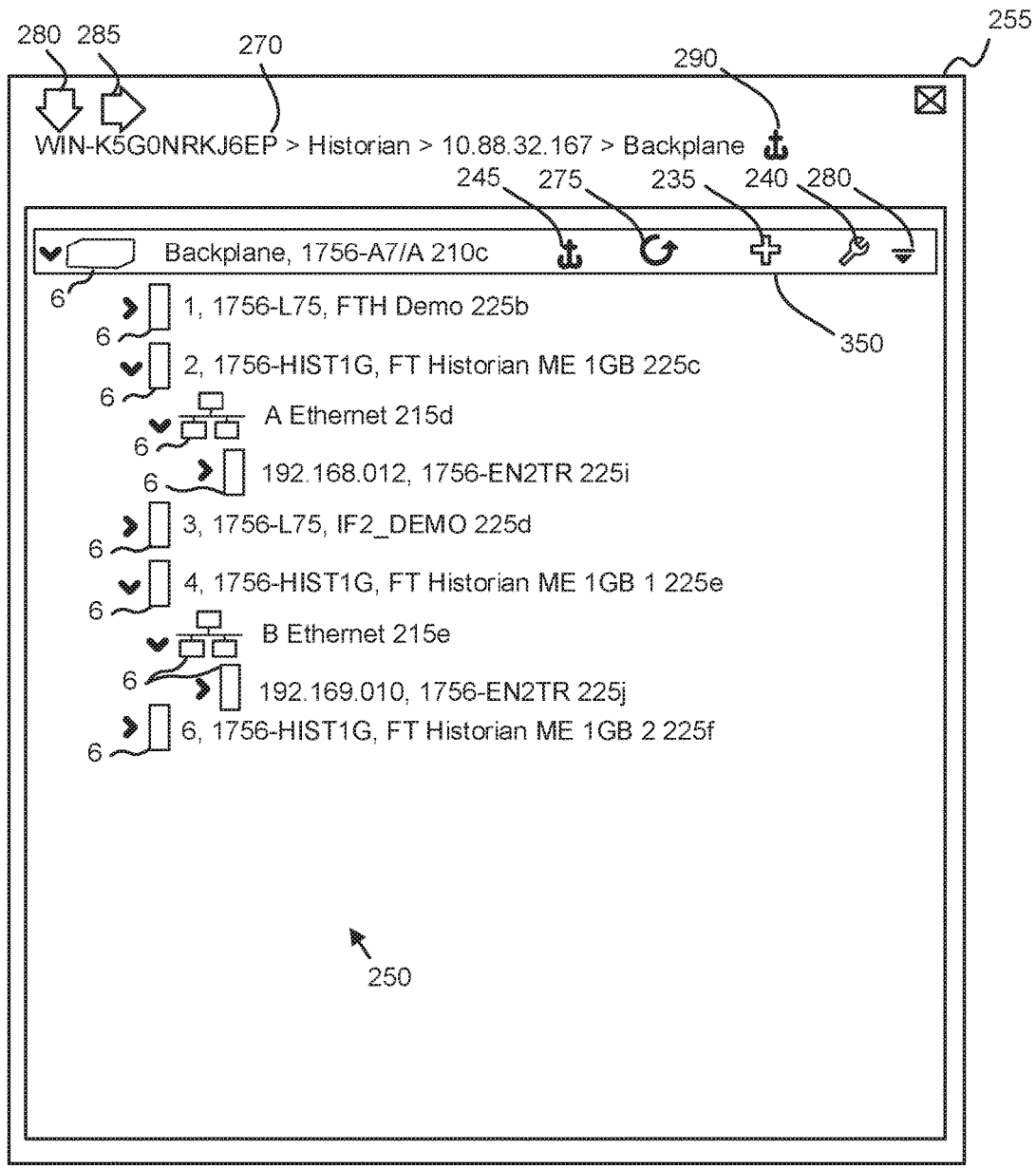
FIG. 2C is a drawing of an alternate anchor node tree structure display according to an embodiment.

FIG. 2C is a drawing of an alternate anchor node tree structure display. In the depicted embodiment, the anchor node tree structure 260 is displayed within a window 255 of a display. The given node 6b is displayed as the topmost node as in FIG. 2B. In addition, branches of two or more sibling child nodes 6 of the given node 6b are also displayed. The user may navigate among one or more branches of sibling nodes 6 and child nodes 6.

The user may further generate an anchor node creation command for any of the branches of sibling nodes 6 and child nodes 6, resulting in the selected sibling node 6 or child nodes 6 been displayed as the topmost node 6. Alternatively, the user may select any parent node 6 from the compact listing 270 as a given parent node 6, resulting in the given parent node 6 been displayed as the topmost node 6. In addition, the user may select the anchor node command 245, resulting in the display of the original topmost node 6a as the topmost node 6.

Figure 2D:
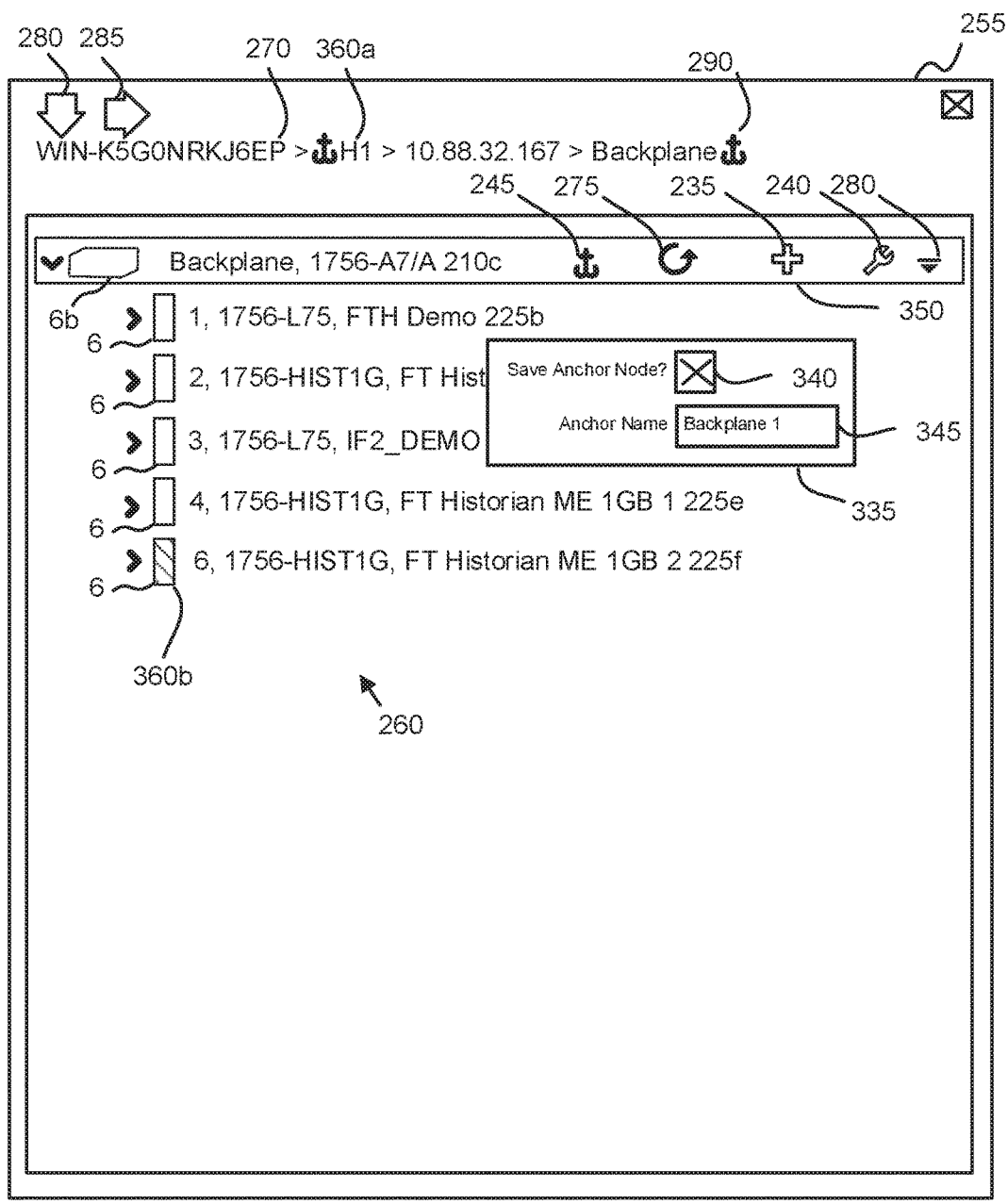
FIG. 2D is a drawing of an anchor node tree structure display with save option according to an embodiment.

FIG. 2D is a drawing of an anchor node tree structure display with a save option. The window 255 and anchor node tree structure 260 of FIG. 2B are shown. In addition, an anchor node save option 335 is displayed. A user may be given the option of saving the given node 6b as a saved anchor node by selecting a save control 340. In addition, a user may enter an anchor name for the given node 6b in an anchor name field 345.

In one embodiment, nodes 6 that have previously been saved as anchor nodes are indicated by anchor indication icons 360a-b. For example, an anchor indication icon 360a and anchor name may be displayed for a saved anchor node in the compact listing 270. Alternatively, a node 6 may be displayed with a highlighted anchor indication icon 360b to indicate that the node 6 is saved as an anchor node.

Figure 2E:
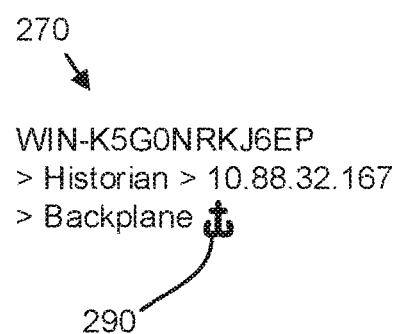
FIG. 2E is an illustration of a compact listing according to an embodiment.

FIG. 2E is an illustration of a compact listing 270. In the depicted embodiment, the compact listing 270 includes labels corresponding to nodes 6. In addition, the compact listing 270 may be disposed over three lines.

Figure 2F:
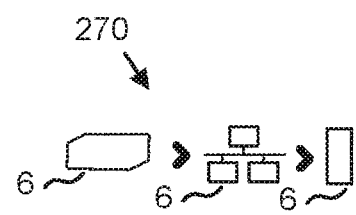
FIG. 2F is an illustration of an alternate compact listing according to an embodiment.

FIG. 2F is an illustration of an alternate compact listing 270. In the depicted embodiment, the compact listing 270 includes icons for each node 6.

Figure 2G:
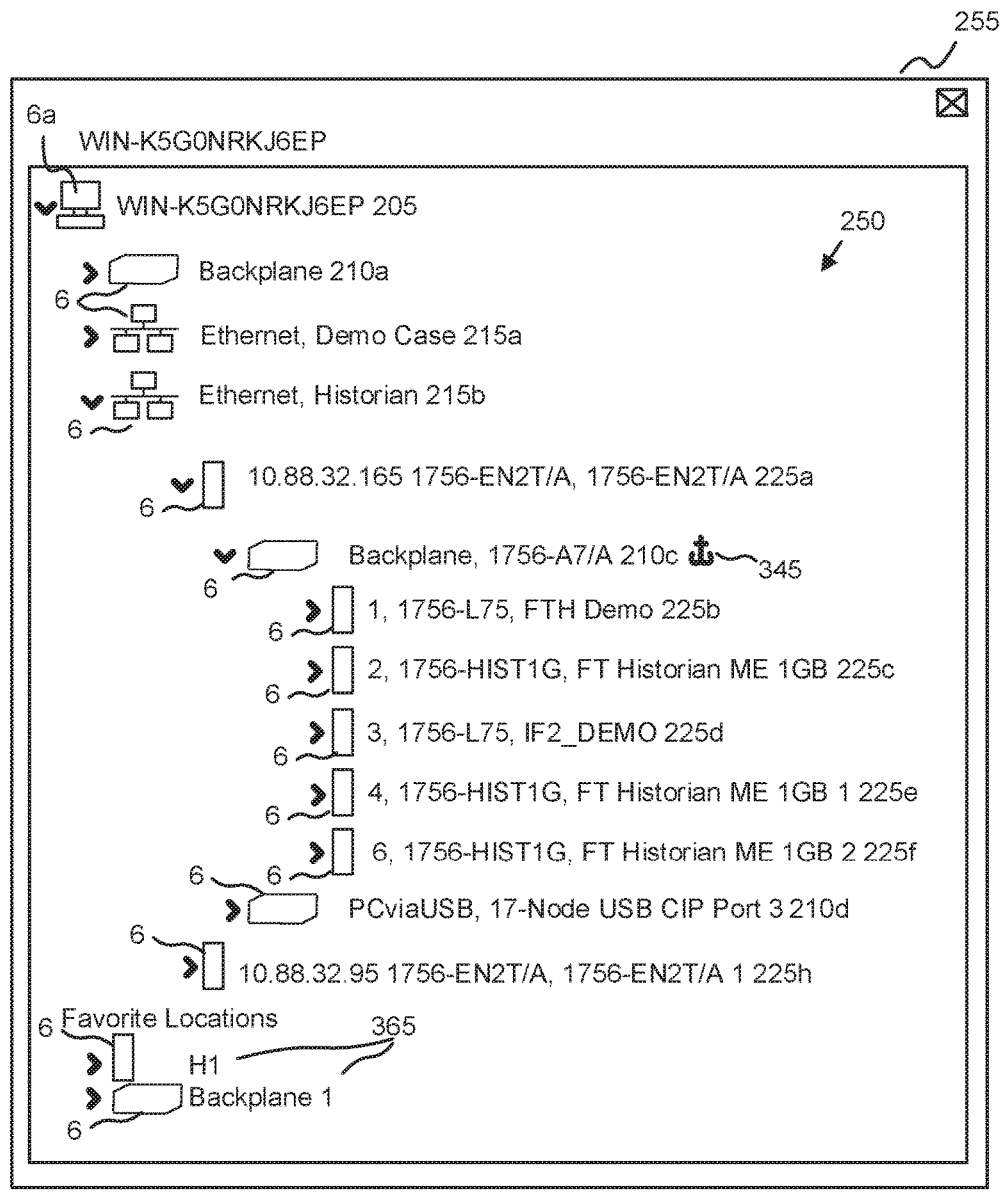
FIG. 2G is a drawing of an anchor favorite locations listing according to an embodiment.

FIG. 2G is a drawing of an anchor favorite locations listing 365. The window 255 and tree structure 250 of FIG. 2A are shown. The anchor favorite locations listing 365 may comprise anchor names and/or icons for one or more nodes 6 that have been saved in anchor data as will be described hereafter. The anchor names and/or icons may be organized in a folder that expands into a tree of nodes 6 as shown. Alternatively, the anchor names and/icons may be organized as a group with a vertical order, a horizontal order, or combinations thereof. The order may be based on frequency of selection.

In one embodiment, when an anchor name is selected from the anchor favorite locations listing 365, a given node 6b corresponding to the anchor name may be displayed as the topmost node, and all branches of parent nodes and branches of sibling and child nodes of the parent nodes may be removed from the tree structure 255.

Figure 2H:
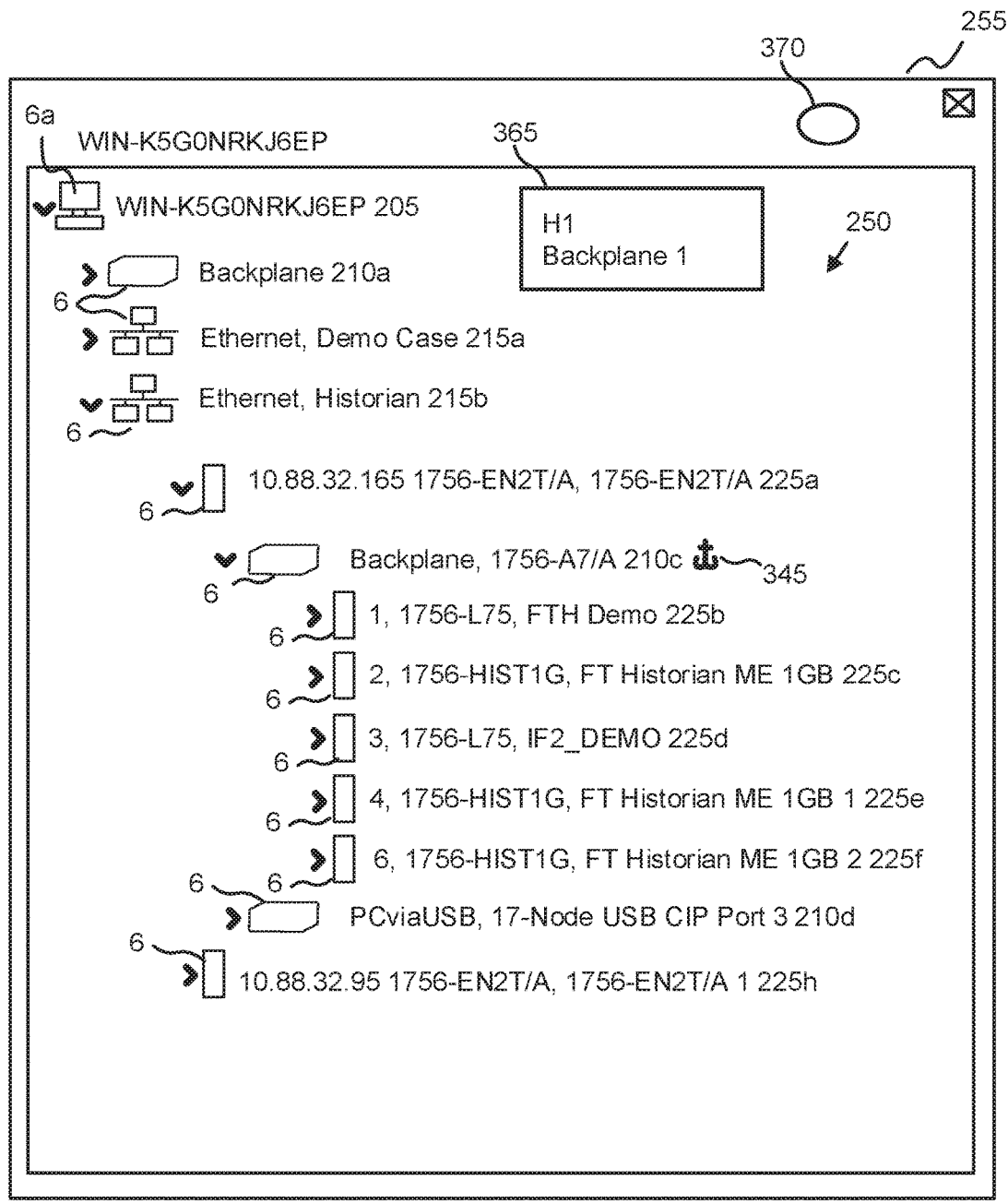
FIG. 2H is a drawing of an alternate anchor favorite locations listing according to an embodiment.

FIG. 2H is a drawing of an alternate anchor favorite locations listing 365. The window 255 and tree structure 250 of FIG. 2A are shown. The anchor favorite locations listing 365 may be displayed in response to an anchor favorite locations listing command. The anchor favorite locations listing command may be received by selecting an anchor listing icon 370. An anchor name may be selected from the anchor favorite locations listing 365 and a given node 6b associated with the anchor name may be displayed as the topmost node.

Figure 3:
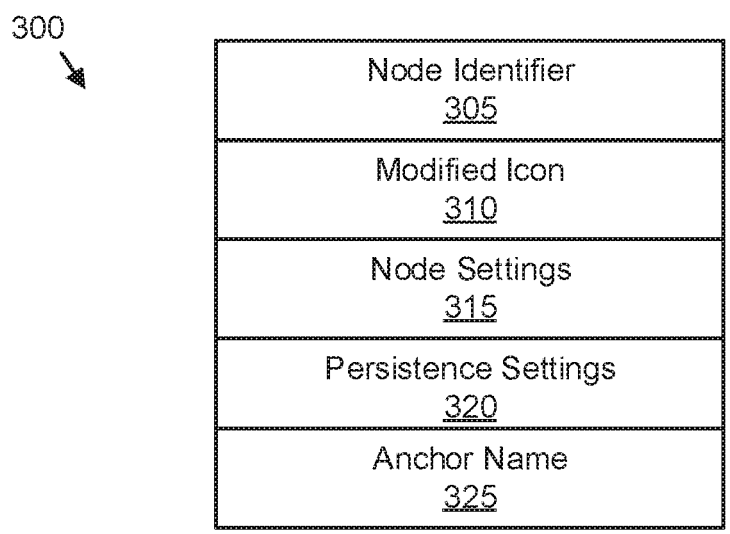
FIG. 3 is a schematic block diagram of anchor data according to an embodiment.

FIG. 3 is a schematic block diagram of anchor data 300. The anchor data 300 maybe organizes a data structure in a memory. In the depicted embodiment, the anchor data 300 includes a node identifier 305, a modified icon 310, node settings 315, persistence settings 320, and an anchor name 325. The anchor data 300 may be used by a processor to manage the given node 6b when the anchor node creation command is received for the given node 6b.

The node identifier 305 may identify the given node 6b. The modified icon 310 may specify a distinctive icon that identifies the given node 6b as an anchor node. The modified icon 310 may specify a larger size, a different color, a distinctive icon, a flashing pattern, or the like. In one embodiment, the modified icon 310 may be used as the anchor indication icon 360.

The node settings 315 may specify options for the given node 6b and all child nodes 6 of the given node 6b. For example, the node settings 315 may specify that one or more parameters such as addresses, statuses, software versions, hardware versions, and the like are displayed for each node 6. In one embodiment, the node settings 315 are modified by the settings option 240.

The persistence settings 320 specify whether or not the anchor data 300 persists after the given node 6b is no longer the anchor node. The persistence settings 320 may indicate the anchor data 300 persists if the save control 340 is activated. The persistent settings 320 may be for the given node 6b, child nodes 6 of the given node 6b, or combinations thereof.

The anchor name 325 may be used to select and retrieve the anchor data 300. A user may be prompted to enter an anchor name 325 for the given node 6b. In one embodiment, the user may be prompted to enter the anchor name 325 if the anchor data 300 persists after the given node 6b is no longer the anchor node. The anchor name 325 may be received from the anchor name field 345.

Figure 4:
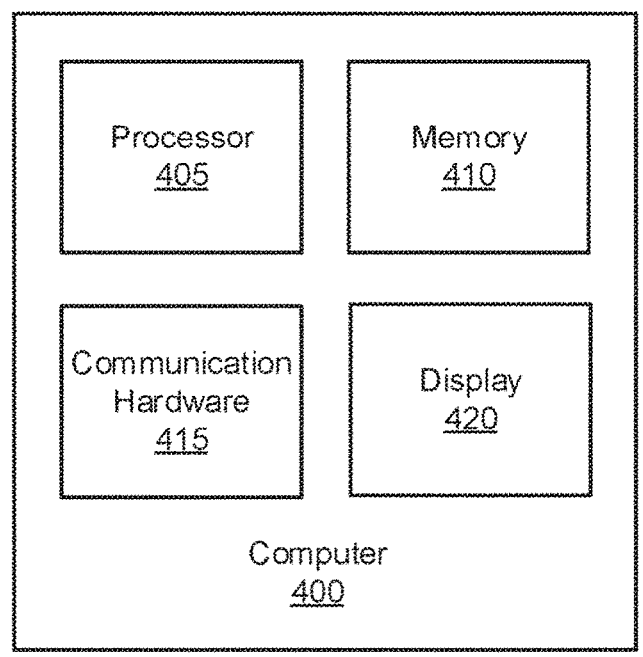
FIG. 4 is a schematic block diagram of a computer according to an embodiment.

The anchor name 325 may be further used to select a given node 6b that is often viewed by user. For example, the anchor name 325 may be included in the anchor name list 365 for selection by a user as shown in FIG. 2G FIG. 4 is a schematic block diagram of a computer 400. The computer 400 may display the tree structure 250 and/or the anchor node tree structure 260 on a display 420. The computer 400 may include a processor 405, a memory 410, communication hardware 415, and the display 420. The memory 410 may comprise a semiconductor storage device, a hard disk drive, an optical storage device, a micromechanical storage device, or combinations thereof. The memory 410 may store code. The memory 410 may be a non-transitory computer-readable storage medium. The processor 405 may execute the code. The communication hardware 415 may communicate with other devices. The display 420 may render one or more windows 255.

Figure 5A:
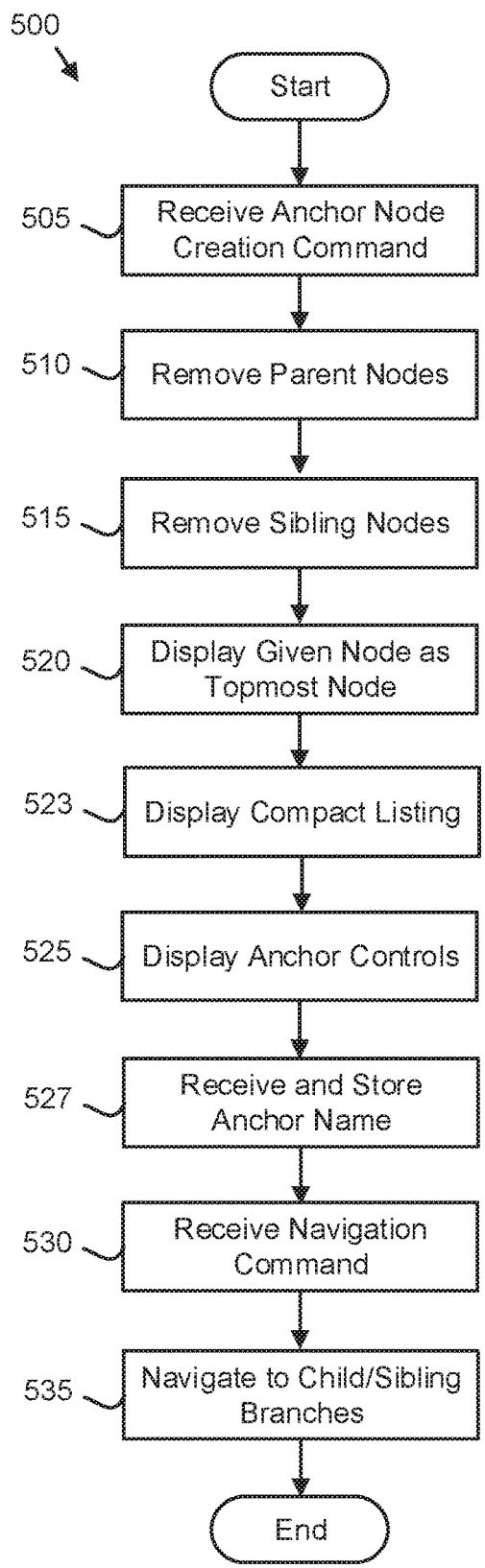
FIG. 5A is a schematic flowchart diagram of an anchor node display method according to an embodiment.

FIG. 5A is a schematic flowchart diagram of an anchor node display method 500. The method 500 may display the given node 6b as a topmost node. In addition, the method 500 may navigate to branches of child nodes 6. The method 500 may be performed by the processor 405. Alternatively, the method 500 may be performed by a computer-readable storage medium.

The method 500 starts, and in one embodiment, the processor 405 receives 505 the anchor node creation command. An anchor option 345 may be displayed in response to a selection of the given node 6b in the tree structure 250. The anchor node creation command may be received 505 in response to displaying the anchor option 345 and receiving a selection of the anchor option 345. The anchor option 345 may be the anchor node command 245. Alternatively, the anchor option 345 may be a pop-up menu.

The processor 405 may remove 510 one or more branches of parent nodes 6 of the given node 6b from the display of the tree structure 250 as shown in FIGS. 2B-D. In addition, the processor 405 may remove 515 branches of sibling nodes 6 of the given node 6b from the display of the tree structure 250. The processor 405 may display 520 the given node 6b as the topmost node.

The processor 405 may display 523 the compact listing 270. Examples of the compact listing 270 are shown in FIGS. 2B-F. In one embodiment, the processor 405 displays 525 the anchor controls 350.

In addition, the processor 405 may receive 527 an anchor name 325 in response to displaying the anchor node save option 335 as shown in FIG. 2D and store the anchor name 325 in the anchor data 300. The processor 405 may also receive a save control 340 that indicates the anchor data 300 for the given node 6b will persist after the given node 6b terminates as anchor node.

The processor 405 may further receive 530 a navigation command directed to the anchor tree data structure 260. The processor 405 may navigate 535 to branches of child nodes 6 and/or branches of sibling nodes 6 of the given node 6b and the method 500 ends.

Figure 5B:
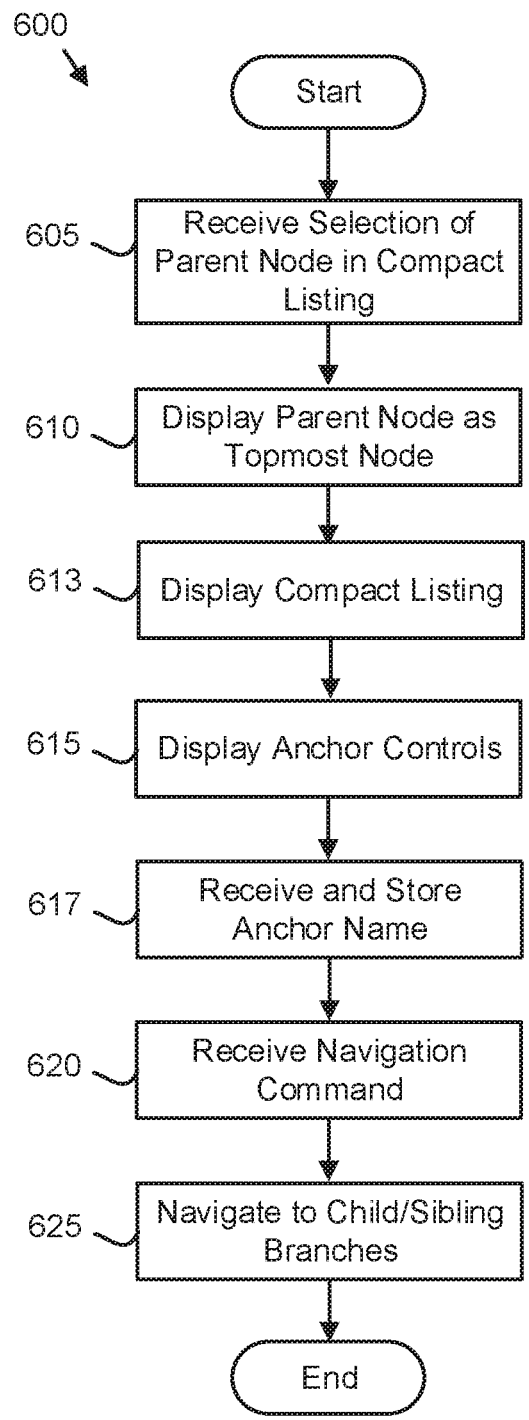
FIG. 5B is a schematic flowchart diagram of a parent node display method according to an embodiment.

FIG. 5B is a schematic flowchart diagram of a parent node display method 600. The method 600 may receive a selection of a parent node 6 from the compact listing 270 and display the parent node 6 as the topmost node. The method 600 may be performed by the processor 405. Alternatively, the method 600 may be performed by a computer-readable storage medium.

The method 600 starts, and in one embodiment, the processor 405 receives 605 a selection of a given parent node 6 from the compact listing 270. The parent node 6 may be selected with a pointing device. The processor 405 may further display 610 the given parent node 6 as the topmost node in the anchor tree data structure 260 and/or the tree structure 250.

The processor 405 may display 523 the compact listing 270. Examples of the compact listing 270 are shown in FIGS. 2B-F. In one embodiment, the processor 405 displays 615 the anchor controls 350.

In addition, the processor 405 may receive 617 an anchor name 325 in response to displaying the anchor node save option 335 as shown in FIG. 2D and store the anchor name 325 in the anchor data 300. The processor 405 may also receive a save control 340 that indicates the anchor data 300 for the given node 6b will persist after the given node 6b terminates as anchor node.

The processor 405 may further receive 620 a navigation command directed to the tree structure 250 and/or the anchor tree data structure 260. The processor 405 may navigate 625 to branches of child nodes 6 and/or branches of sibling nodes 6 of the given parent node 6 and the method 600 ends.

Figure 5C:
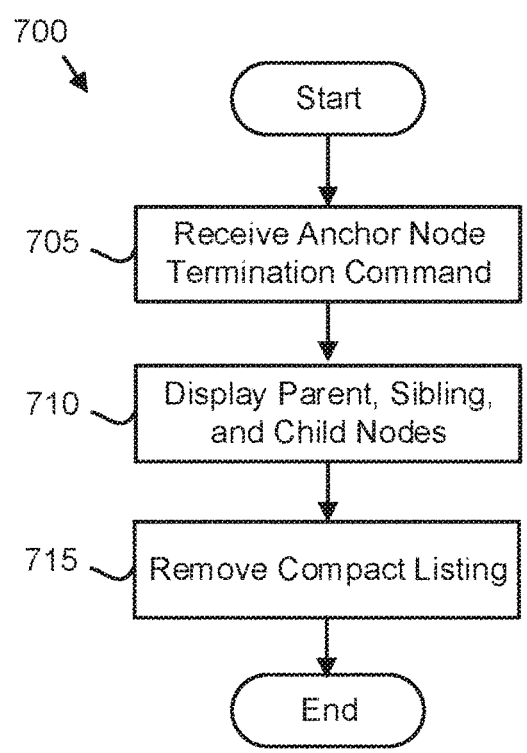
FIG. 5C is a schematic flowchart diagram of an anchor node termination method according to an embodiment.

FIG. 5C is a schematic flowchart diagram of an anchor node termination method 700. The method 700 may terminate a given node 6b as an anchor node and/or topmost node 6. The method 700 may be performed by the processor 405. Alternatively, the method 700 may be performed by a computer-readable storage medium.

In one embodiment, the processor 405 receives 705 an anchor node termination command. The anchor node termination command may be generated by selecting the anchor node command 245. Alternatively, the anchor node termination command may be selected from a pop-up menu.

The processor 405 may further display 710 the topmost node 6a, and the one or more branches of nodes 6 that branch from the topmost node 6a, branches of sibling nodes 6, and/or child nodes 6 of the topmost node 6a. FIG. 2A shows an example of a tree structure after executing the anchor node termination command.

In one embodiment, the processor 405 removes 715 the compact listing 270 and the method ends. The compact listing 270 may be removed from the window 255.

Figure 5D:
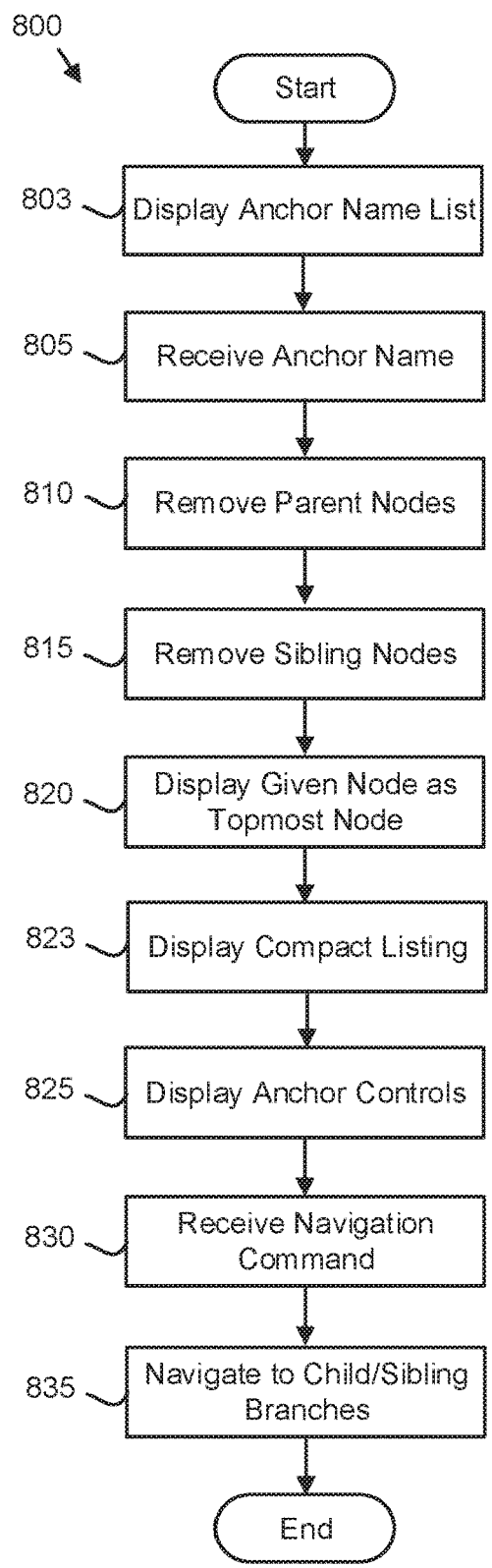
FIG. 5D is a schematic flowchart diagram of an alternate anchor node display method according to an embodiment.

FIG. 5D is a schematic flowchart diagram of an alternate anchor node display method 800. The method 800 may display a saved given node 6b as a topmost node. In addition, the method 800 may navigate to branches of child nodes 6. The method 800 may be performed by the processor 405. Alternatively, the method 500 may be performed by a computer-readable storage medium.

The method 800 starts, and in one embodiment, the processor 405 displays 803 the anchor name list 365. The anchor name list 365 may be generated from the anchor data 300. The processor 405 may receive 805 an anchor name 325. The anchor name 325 may be received from the anchor name list 365 as shown in FIG. 2G. The anchor name 325 identify a given node 6b from anchor data 300.

The processor 405 may remove 810 one or more branches of parent nodes 6 of the given node 6b from the display of the tree structure 250 as shown in FIGS. 2B-D. In addition, the processor 405 may remove 815 branches of sibling nodes 6 of the given node 6b from the display of the tree structure 250. The processor 405 may display 820 the given node 6b as the topmost node.

The processor 405 may display 823 the compact listing 270. Examples of the compact listing 270 are shown in FIGS. 2B-F. In one embodiment, the processor 405 displays 825 the anchor controls 350.

The processor 405 may further receive 830 a navigation command directed to the anchor tree data structure 260. The processor 405 may navigate 835 to branches of child nodes 6 and/or branches of sibling nodes 6 of the given node 6b and the method 800 ends.

The embodiments receive the anchor node creation command for the given node 6b and remove branches of parent nodes 6 and sibling nodes of the given node 6b while displaying the given node 6b as a topmost node of the tree structure 250 and/or anchor node tree structure 260. As a result, a user may more easily navigate to sibling nodes 6 and child nodes 6 of the given node 6b.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus comprising:
a processor;
a memory storing code executable by the processor to:
receive an anchor node creation command from a user for a given node of a tree structure of nodes, wherein each node represents one of an electronic device and a network and the given node has one or more branches of parent nodes;
remove the one or more branches of parent nodes and branches of sibling nodes of the given node from a display of the tree structure;
display the given node as a topmost node of the tree structure;
display a compact listing of icons of the one or more branches of parent nodes of the given node organized as a horizontal dependency diagram comprising an anchor position symbol that indicates a relationship of the given node to the one or more branches of parent nodes;
display anchor controls comprising an anchor node command, a refresh command, an add link command, and a menu command;
display an anchor node save option that receives an anchor name for the anchor node;
receive a save control from the user that stores the anchor name with anchor data; and
display an anchor name list with the anchor name, wherein the anchor name is organized as a folder that expands into a tree of nodes.

2. The apparatus of claim 1, wherein the processor further navigates to one or more branches of child nodes of the given node in response to navigation commands.

3. The apparatus of claim 2, wherein branches of two of more sibling child nodes of the given node are displayed.

4. The apparatus of claim 1, wherein receiving the anchor node creation command comprises:
displaying an anchor option in response to a selection of the given node in the tree structure; and
receiving a selection of the anchor option.

5. The apparatus of claim 1, wherein the processor further performs:
receiving a selection of a given parent node from the compact listing; and
displaying the given parent node as a topmost node of the tree structure.

6. The apparatus of claim 1, wherein the processor further performs:
receiving an anchor node termination command; and
displaying the one or more branches of parent nodes, the given node, the branches of sibling nodes, and displayed child nodes of the given node in the tree structure.

7. The apparatus of claim 1, wherein the anchor controls comprise a settings option that modifies the display settings for the given node and all branches of child nodes of the given node.

8. A method comprising:
receiving, by use of a processor, an anchor node creation command from a user for a given node of a tree structure of nodes, wherein each node represents one of an electronic device and a network and the given node has one or more branches of parent nodes;
removing the one or more branches of parent nodes and branches of sibling nodes of the given node from a display of the tree structure;
displaying the given node as a topmost node of the tree structure;
displaying a compact listing of icons of the one or more branches of parent nodes of the given node organized as a horizontal dependency diagram comprising an anchor position symbol that indicates a relationship of the given node to the one or more branches of parent nodes;
displaying anchor controls comprising an anchor node command, a refresh command, an add link command, and a menu command;
displaying an anchor node save option that receives an anchor name for the anchor node;
receiving a save control from the user that stores the anchor name with anchor data; and
displaying an anchor name list with the anchor name, wherein the anchor name is organized as a folder that expands into a tree of nodes.

9. The method of claim 8, the method further comprising navigating to one or more branches of child nodes of the given node in response to navigation commands.

10. The method of claim 9, wherein branches of two of more sibling child nodes of the given node are displayed.

11. The method of claim 8, wherein receiving the anchor node creation command comprises:
displaying an anchor option in response to a selection of the given node in the tree structure; and
receiving a selection of the anchor option.

12. The method of claim 8, the method further comprising:
receiving a selection of a given parent node from the compact listing; and
displaying the given parent node as a topmost node of the tree structure.

13. The method of claim 8, the method further comprising:
receiving an anchor node termination command; and
displaying the one or more branches of parent nodes, the given node, the sibling nodes, and displayed child nodes of the given node in the tree structure.

14. The method of claim 8, wherein the anchor controls comprise a settings option that modifies the display settings for the given node and all branches of child nodes of the given node.

15. The method of claim 8, the method further comprising
displaying the given node as the topmost node of the tree structure in response to receiving the anchor name from the anchor name list.

16. A non-transitory computer-readable storage medium having instructions stored thereon that, in response to execution, cause a system comprising a processor to perform operations comprising:
receiving an anchor node creation command from a user for a given node of a tree structure of nodes, wherein each node represents one of an electronic device and a network and the given node has one or more branches of parent nodes;
removing the one or more branches of parent nodes and branches of sibling nodes of the given node from a display of the tree structure;
displaying the given node as a topmost node of the tree structure;
displaying a compact listing of icons of the one or more branches of parent nodes of the given node organized as a horizontal dependency diagram comprising an anchor position symbol that indicates a relationship of the given node to the one or more branches of parent nodes;
displaying anchor controls comprising an anchor node command, a refresh command, an add link command, and a menu command;
displaying an anchor node save option that receives an anchor name for the anchor node;
receiving a save control from the user that stores the anchor name with anchor data; and
displaying an anchor name list with the anchor name, wherein the anchor name is organized as a folder that expands into a tree of nodes.

17. The apparatus of claim 1, wherein the processor further displays the given node as the topmost node of the tree structure in response to receiving the anchor name from the anchor name list.

18. The apparatus of claim 1, wherein the anchor name list is separate from the tree structure.

19. The method of claim 8, wherein the anchor name list is separate from the tree structure.

20. The non-transitory computer-readable storage medium of claim 16, wherein the anchor name list is separate from the tree structure.

* * * * *